(12) United States Patent
Hara et al.

(10) Patent No.: US 6,371,442 B1
(45) Date of Patent: Apr. 16, 2002

(54) FLUID FLOW REGULATOR (75) Inventors: Tetsuhiko Hara; Shingo Tanaka; Hideo Sasaki, all of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/618,161

(22) Filed: Jul. 17, 2000

(30) Foreign Application Priority Data

Jul. 16, 1999 (JP) .......................................... 11-202632

(51) Int. Cl.[7] .............................. F16K 1/48; F16K 31/04
(52) U.S. Cl. ...................................... 251/129.11; 251/80
(58) Field of Search .......................... 251/77, 80, 129.11

(56) References Cited

U.S. PATENT DOCUMENTS

| | | | | | |
|---|---|---|---|---|---|
| 2,589,183 A | * | 3/1952 | Craene et al. | ......... | 251/129.11 |
| 4,650,156 A | * | 3/1987 | Kawahira | .............. | 251/129.11 |
| 4,723,754 A | * | 2/1988 | Torimoto et al. | ...... | 251/129.05 |
| 4,948,091 A | * | 8/1990 | Satoh et al. | .................... | 251/65 |
| 5,024,418 A | * | 6/1991 | Reinicke et al. | ....... | 251/129.11 |
| 5,137,255 A | * | 8/1992 | Sumida et al. | ................. | 251/77 |
| 5,318,064 A | * | 6/1994 | Reinicke | ................... | 137/487.5 |

* cited by examiner

*Primary Examiner*—John Fox
(74) *Attorney, Agent, or Firm*—Sughrue Mion, PLLC (57) ABSTRACT

A cylindrical main body is provided with an inlet port and an outlet port. The outlet port is formed on a front end portion of the main body. A carriage is accommodated inside the cylindrical main body slidably in an axial direction of the main body. A sphere is held in the carriage such that a part thereof is exposed on a front end portion of the carriage. A carriage driver is provided for reciprocally moving the carriage inside the main body. A fluid flew into the main body from the inlet port stops flowing out from the outlet port when the sphere is abutted against the outlet port while the carriage is moved by the carriage driver toward the outlet port. The fluid starts flowing out from the outlet port when the sphere is separated from the outlet port while the carriage is moved away from the outlet port by the carriage driver.

4 Claims, 5 Drawing Sheets

FLUID FLOW REGULATOR

BACKGROUND OF THE INVENTION

The present invention relates to improvements of a fluid flow regulator incorporating a stepping motor or the like as a driving source for opening/closing a valve.

As flow regulators for a refrigerant in a refrigerator or an air conditioner, one using a solenoid valve or one using a needle valve are well known.

However, the flow regulator using a solenoid valve generally effects the setting of either opening or closing, and is not suitable for fine regulation of the flow rate. In addition, large noise is made when the valve is opened or closed. Further, when the solenoid valve is in either an open or a closed state, the solenoid valve needs to be set in an energized state to maintain that state, so that there is a problem in terms of power consumption as well.

On the other hand, in the case of the flow regulator using a needle valve, the flow rate of a fluid is controlled by using a stepping motor or the like as a driving source, and by converting the rotational force of the stepping motor using the thrust of the needle valve. As compared with the apparatus using the solenoid valve, the problem of the operating noise is small, and it is possible to finely regulate the flow rate.

However, with many flow regulators using the needle valve, the size of the motor as a driving source is generally large. Conceivably, this is mainly due to the fact that many of these apparatuses are used for controlling the flow rate of a refrigerant in air conditioners or the like. Namely, in the case of the air conditioner, since the pressure difference between the inlet side of the refrigerant and the outlet side thereof when the refrigerant is interrupted, it is necessary to move the needle valve with large thrust. Consequently, the size of the motor inevitably becomes large for driving the valve.

However, if the apparatus using the needle valve is used as it is as the apparatus for controlling the flow rate of a refrigerant in a refrigerator or the like, there is a problem in terms of space. In the case of the refrigerator, various compartment parts are required to be as small as possible to provide a large space for a food compartment. Accordingly, the flow regulator for the refrigerant is also naturally required to be as compact as possible. Nevertheless, if the motor size is reduced, a problem arises in that torque necessary for effecting reliable flow-rate control cannot be obtained.

Further, with the needle valve, the positional relationship between the central axis of the needle valve in a moving direction thereof and the central axis of a channel into which the needle valve is inserted, among others, is subtle so as to effect control with high accuracy. Therefore, there is another problem in that highly accurate design techniques and experiential know-how during assembly are required.

SUMMARY OF THE INVENTION

Accordingly, an object of the invention is to provide a fluid flow regulator which is simple in structure and compact, which makes it possible to effect reliable flow-rate control of a fluid, and which produces practically no operating noise during control.

In order to achieve the above object, according to the present invention, as the carriage is moved in a direction toward the fluid outlet port of the main body by the driving source, the spherical face of the sphere held in the carriage is brought into contact with the fluid outlet port provided in the main body so as to set the fluid outlet port in a closed state. Meanwhile, as the carriage is moved away from the fluid outlet port, the spherical face of the sphere is set in a state of non-contact with respect to the fluid outlet port so as to set the fluid outlet port in an open state. Accordingly, it is possible to effect reliable flow regulation control (particularly, control for stopping or allowing the flow of a fluid) with a simple structure.

In addition, since the opening/closing of the fluid outlet port are effected by the spherical face of the sphere, no subtle adjustment is required such as positioning the tip of the needle valve and the central axis of the fluid outlet port coaxially as in the case of the needle valve, so that the adjusting operation during assembling can be alleviated, thereby improving the productivity.

DETAILED DESCRIPTION OF THE PREFERRED EMBODIMENTS

Referring now to FIGS. 1 to 7, a description will be given of an embodiment of the invention.

Figure 1:
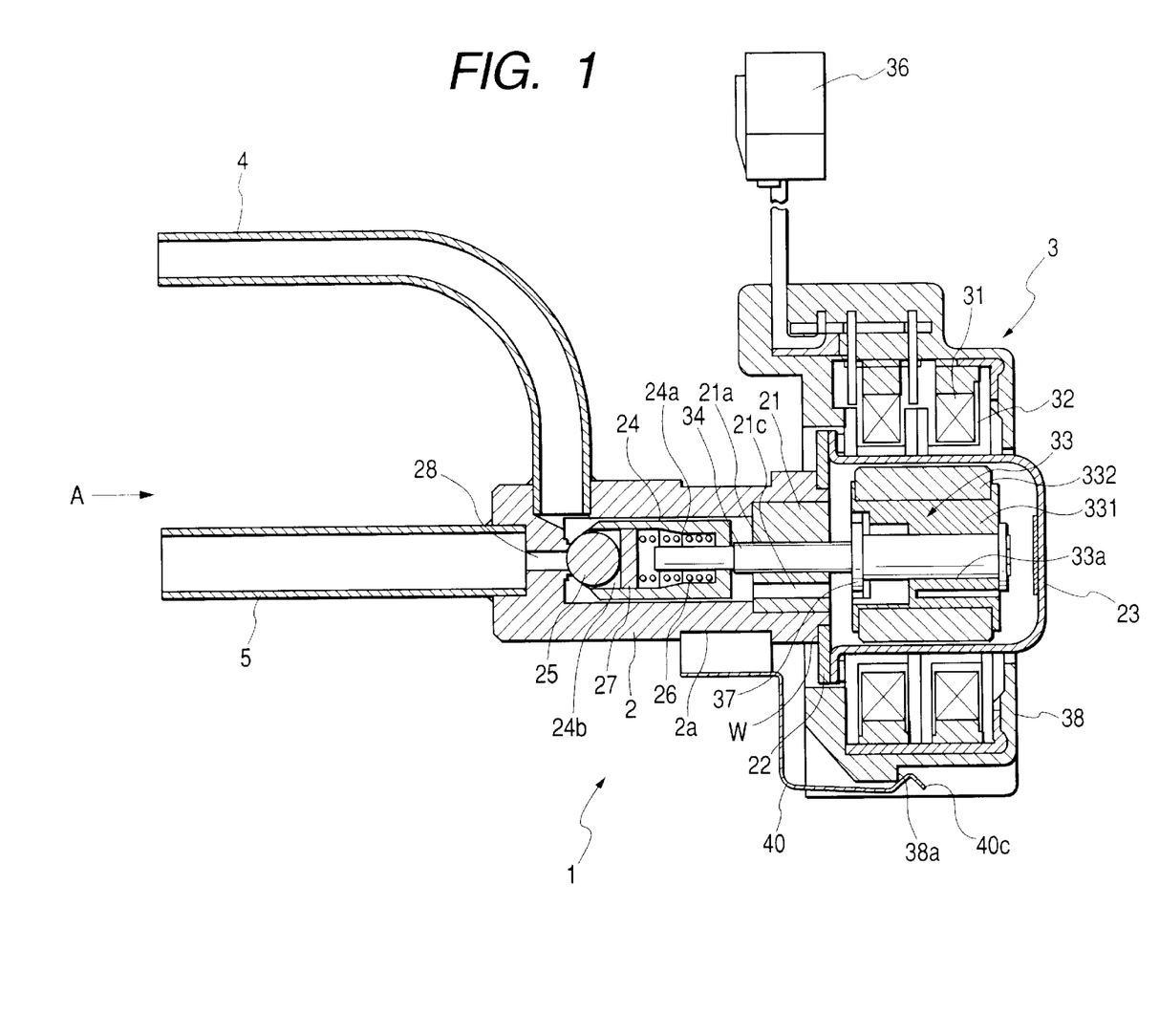
FIG. 1 is a side cross-sectional view of a fluid flow regulator in accordance with an embodiment of the invention.
Figure 2:
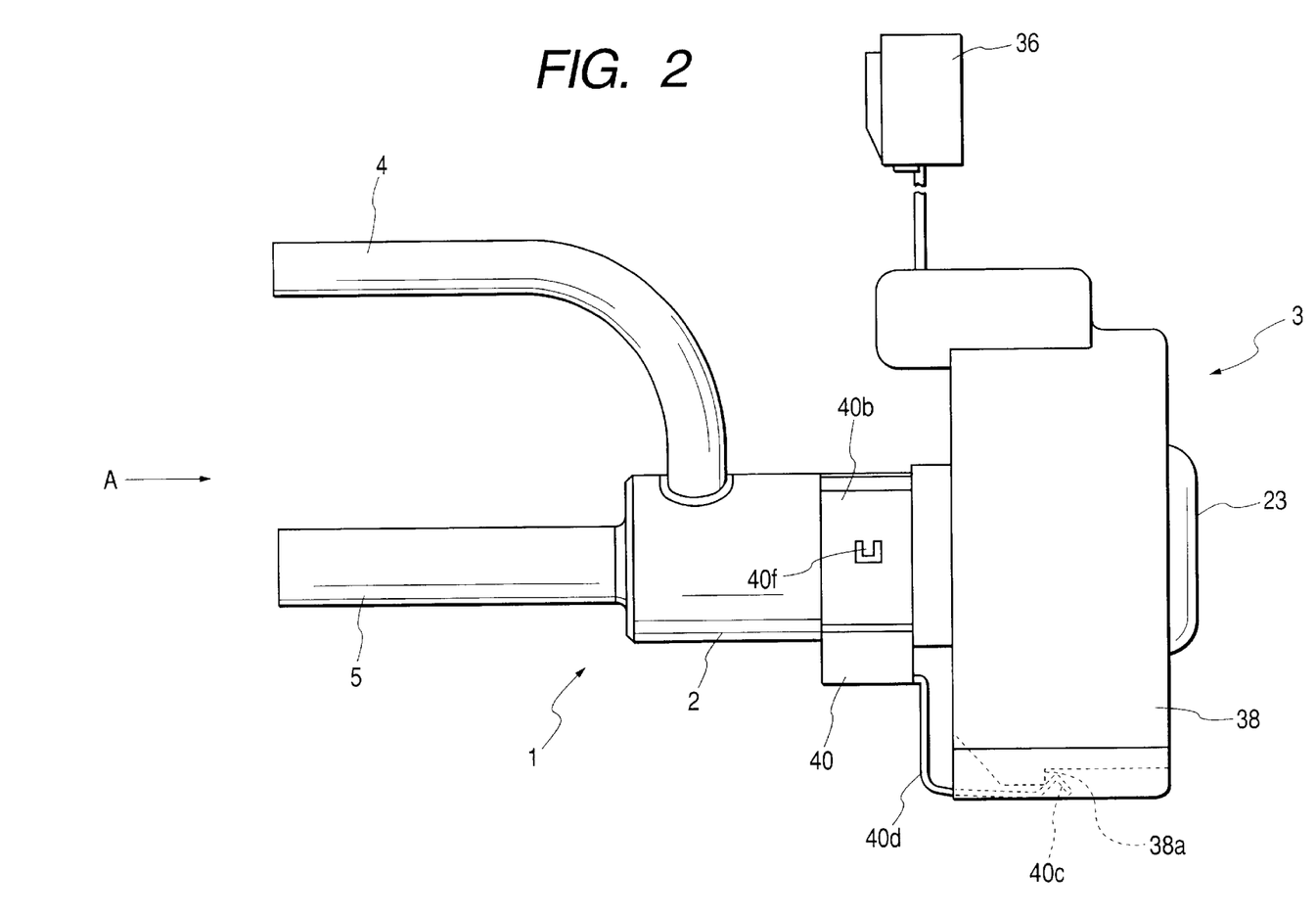
FIG. 2 is a side elevational view illustrating the fluid flow regulator.
Figure 3:
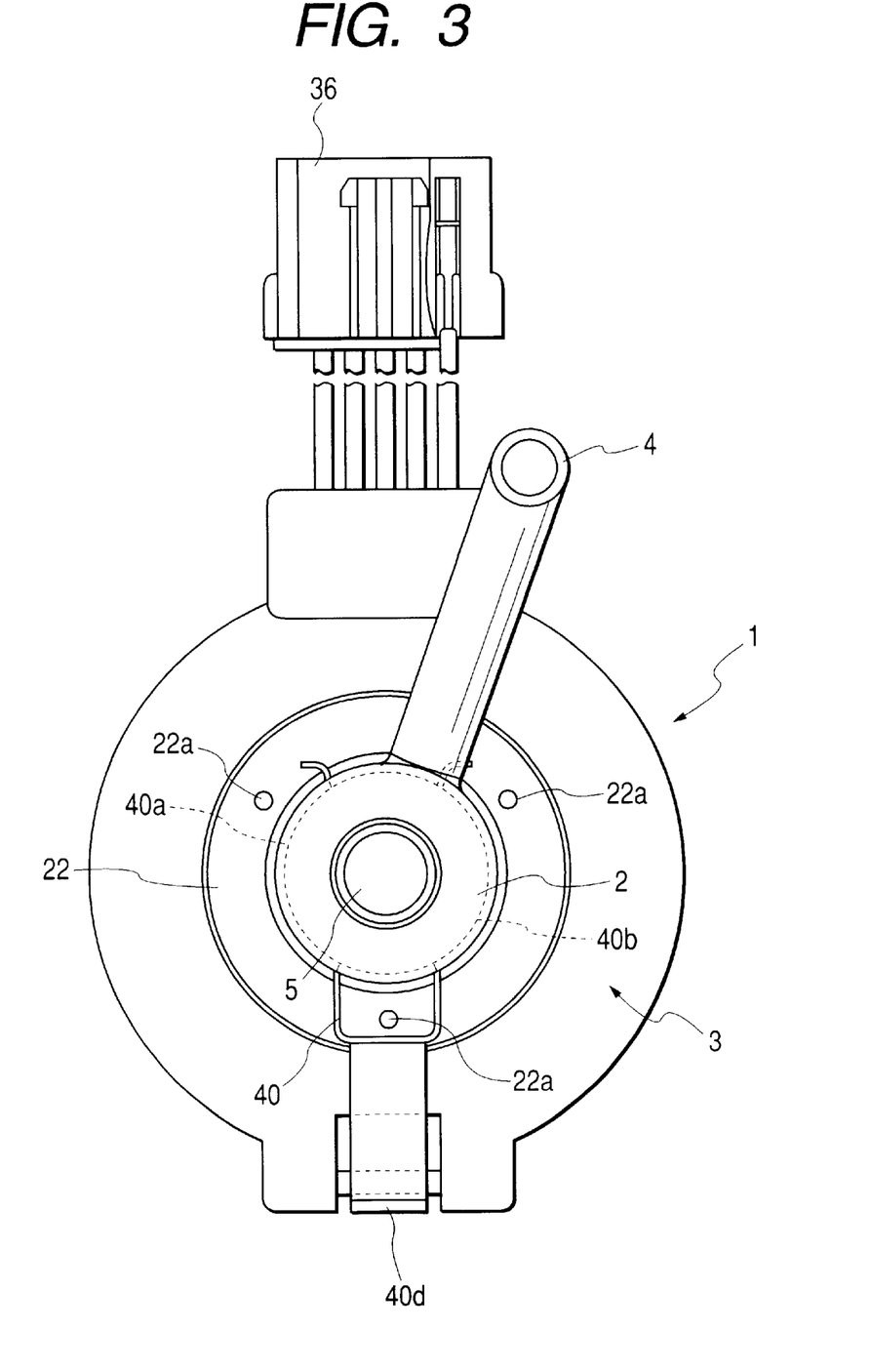
FIG. 3 a front elevational view taken in the direction of the arrow A shown in FIG. 2.

FIGS. 1 to 3 illustrate the overall construction of a fluid flow regulator in accordance with an embodiment of the invention. FIG. 1 is a side cross-sectional view, FIG. 2 is a side elevational view illustrating an external configuration, and FIG. 3 is a front elevational view taken in the direction of the arrow A in FIG. 2.

If a description is given by largely dividing its external configuration, a fluid regulator 1 shown in FIGS. 1, 2, and 3 comprises a main body 2; a motor (since a stepping motor is used in this embodiment, the motor will be hereafter referred to as the stepping motor) 3 attached to a rear end portion of the main body 2 and serving as a driving source for opening/closing a valve (details of which will be described later); an inlet pipe (hereafter referred to as the inlet pipe) 4 on the inlet side of a fluid; and a pipe (hereafter referred to as the outlet pipe) 5 on the outlet side of the fluid, which are attached to a front end portion of the main body 2.

The stepping motor 3 comprises a stator 32 with a coil 31 wound therearound; a rotor 33 disposed inside the stator 32 in a face-to-face relation thereto; and a rotary shaft 34 rotatably supported in a shaft supporting hole 33a extending in the direction of the central axis of the rotor 33.

In this state, as electric power is supplied from a power supply unit 36 to the coil 31, the rotor 33 is rotated. Further, the stator 32 with the coil 31 wound therearound is accommodated in a stator casing 38 which is detachably fitted with the main body 2 by means of a holder 40 (described later). It should be noted that the stator 32 is so structured that the coil 31 is formed integrally with pole teeth or the like of the stator 32 by means of a resin, and the coil 31 is sealed.

In this embodiment, the main body 2 is formed of brass of a hollow cylindrical shape, and a bearing 21 for rotatably supporting the rotary shaft 34 of the stepping motor 3 is press-fitted into its interior on the rear-end portion thereof. Further, a flange plate 22 which is joined to the main body 2 by brazing (the joined portion is designated at W) is provided at a rear end portion of the main body 2. A rotor casing 23 for accommodating the rotor 33 of the stepping motor 3 is welded to the flange plate 22 by using a tungsten inert gas (TIG). The flange plate 22 and the rotor casing 23 are formed of a stainless steel (SUS), and will be collectively referred to as the rotor casing assembly.

In addition, the rotary shaft 34 of the stepping motor 3 is rotatably supported by the bearing 21 of the main body 2, and external threads are formed on the shaft portion of the rotary shaft 34. Meanwhile, internal threads are formed on an inner periphery of a shaft supporting hole 21a of the bearing 21, and the external threads and internal threads are in mesh with each other.

Consequently, when the rotor 33 rotates, the rotor 33 and its rotary shaft 34 linearly move in the axial direction along the direction of the central axis of the rotary shaft 34 while rotating inside the main body 2. It should be noted that the rotating direction of the rotor 33 for advancing the rotary shaft 34 in the inserting direction of the main body 2 (in the direction toward the front end of the main body 2) will be herein referred to as forward rotation. Accordingly, when the rotation of the rotor 33 is reversed (reverse rotation), the rotor 33 and its rotary shaft 34 move in the direction toward the rear end side of the main body 2. The rotor casing 23 may be provided with an unillustrated restricting member so as to stop the rotor 33 at a proper position with respect to the stator 32 at the time of this movement toward the rear end side.

A carriage 24 is attached to a front end of the rotary shaft 34. This carriage 24 moves inside the main body 2 together with the rotary shaft 34 in conjunction with the forward and reverse rotation of the rotor 33. A sphere 25 serving as a valve is accommodated inside the carriage 24 and in the vicinity of a front end of the carriage 24, and a coil spring 26 serving as a resilient member is interposed between the sphere 25 and the rotary shaft 34.

In addition, a plate 27 is interposed between the sphere 25 and the coil spring 26, and a force for pressing the sphere 25 in a direction toward the front end of the carriage 24 is imparted to the sphere 25 by the extending force of the coil spring 26. It should be noted that the front end of the carriage 24 is opened so that a portion of the spherical face of the sphere 25 is exposed from the carriage 24. In addition, the load of the coil spring 26 at the time of assembling is set to such a load that the sphere 25 does not vibrate under the pressure of the fluid in actual use.

In addition, the inlet pipe 4 is attached to a side face of a vicinity of the front end of the main body 2, while the outlet pipe 5 is attached to a front end portion of the main body 2.

The arrangement provided is such that the fluid (a refrigerant in this case) which passed through the inlet pipe 4 temporarily enters the main body 2, then passes through a narrow fluid outlet port 28 provided in the front end portion of the main body 2, and then flows out to the outlet pipe 5.

Then, the flow of the refrigerant, which enters the main body 2 through the inlet pipe 4 and flows out to the outlet pipe 5 via the fluid outlet port 28, is controlled as the sphere 25 assumes a state of contact or a state of non-contact with the fluid outlet port 28 in conjunction with the movement of the carriage 24. It should be noted that although, in this embodiment, it is possible to effect control for changing the flow rate of the refrigerant in a finely regulating manner, the invention is suitable for use in a case where setting is provided to assume either a state in which the refrigerant is allowed to pass or a state in which its flow is stopped, i.e., an on state (the state in which the refrigerant is allowed to pass) or an off state (the state in which the flow of the refrigerant is stopped). Hence, a description will be given of an example in which the invention is used for such a case.

A fluid outlet port 28 provided in the front end portion of the main body 2 is adapted to set the refrigerant flow in the off state as the spherical face of the sphere 25 held in the carriage 24 is brought into contact with the fluid outlet port 28. To obtain a reliable off state, that portion of the fluid outlet port 28 which abuts against the sphere 25 is provided with a curved face (concave face) having the same curvature as that of the spherical face of the sphere 25. This curved face can be obtained by firmly pressing a sphere having the same shape as the sphere 25 against the relevant portion of the fluid outlet port 28 so as to transfer the shape during a fabrication stage.

Figure 4:
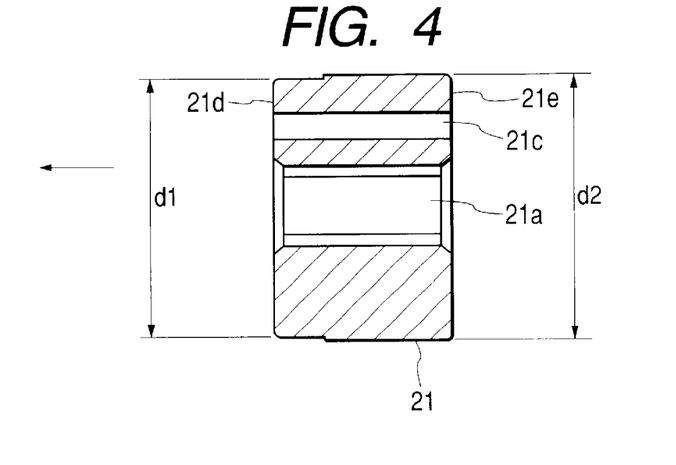
FIG. 4 is a side cross-sectional view illustrating a bearing attached to a main body of the fluid flow regulator shown in FIG. 1.

In addition, as shown in FIG. 4, the bearing 21 has a communication passage 21c which extends from one end face 21d of the bearing 21 to the other end face 21e thereof in such a manner as to be parallel to the shaft supporting hole 21a. Further, an outer diameter d1 of the main body 2 on its front end side in the press-fitting direction is made slightly smaller than an outer diameter d2 thereof on its rear end side. Cuttings which are produced during the press-fitting of the bearing 21 can be received on a stepped portion defined by this difference in the outer diameter.

In a direction of an arrow shown in FIG. 4, this bearing 21 is press-fitted to the main body 2 in a state in which the rotary shaft 34 is screwed into the bearing 21, and the carriage 24 (with the sphere 25, the plate 27, and the coil spring 26 accommodated in the carriage 24) has already been attached to the front end of the rotary shaft 34.

The communication passage 21c of the bearing 21 is an air-venting through hole used when the interior of the rotor casing 23 is set in a state of vacuum, and this communication passage 21c is also used as an introducing channel when a Freon gas as a refrigerant is charged after the evacuation. Incidentally, the operation of attaching the bearing 21 to the main body 2 and the operation of charging the Freon gas are effected in a state in which the rotary shaft 34 is already in the state of being attached to the bearing 21, but the rotor 33 is not yet attached to the rotary shaft 34.

Figure 5A:
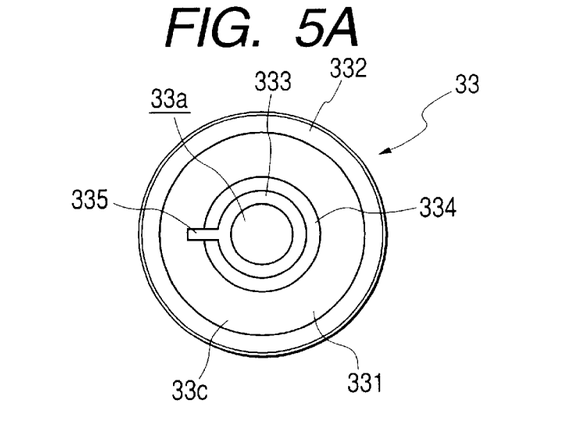
FIG. 5A is a plan view illustrating a rotor of a stepping motor used in the fluid flow regulator shown in FIG. 1.
Figure 5B:
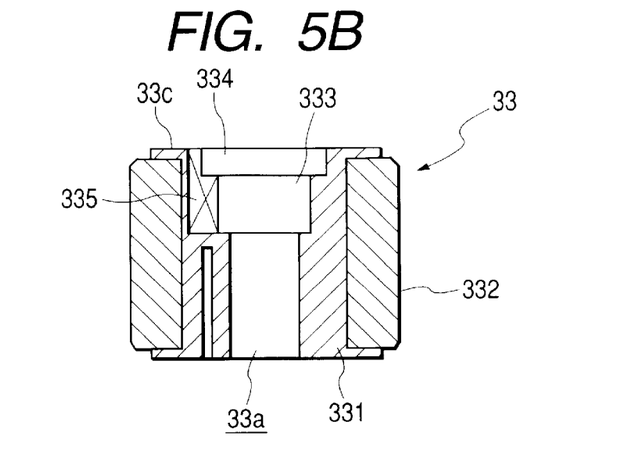
FIG. 5B is a side cross-sectional view of the rotor.

As shown in FIGS. 5A and 5B, the rotor 33 includes a hollow cylindrical member 331 made of a synthetic resin and a magnet 332 fitted to its periphery. In addition, the shaft supporting hole 33a into which the rotary shaft 34 is detachably inserted is provided in a central portion of the hollow cylindrical member 331. A large-diameter section having an inner diameter larger than the shaft supporting hole 33a is formed on an end portion 33c side of the shaft supporting hole 33a on the bearing 21 side. This large-diameter section includes a first large hole 333 and a second large hole 334 formed between the first large hole 333 and the end portion 33c and having a diameter larger than the first large hole 333. A slit 335 which linearly passes through the second large hole 334 and the first large hole 333 is formed in side walls of the first large hole 333 and the second large hole 334.

Meanwhile, an engaging member (not shown) which engages the slit 335 is provided on the rotary shaft 34. When the rotary shaft 34 is inserted in the through hole 33a of the hollow cylindrical member 331 of the rotor 33, the rotary shaft 34 is inserted in the through hole 33a such that the engaging member enters the slit 335. Consequently, the engaging member of the rotary shaft 34 advances to a terminating portion of the first large hole 333 by using the slit 335 as a guide, and further insertion of the rotary shaft 34 is restricted there. Then, the rotary shaft 34 and the rotor 33 are engaged with each other by this engaging member, and are arranged to be rotatable as a unit.

Then, the stator 32 with the coil 31 wound therearound is fitted over the rotor casing assembly in such a manner as to cover the outer periphery of the side face of the rotor casing assembly. This stator 32 is fitted to the main body 2 in a state in which the stator 32 is accommodated in the stator casing 38. It should be noted that when the stator casing 38 is fitted to the main body 2, the stator casing 38 is held by the holder 40 in such a manner as to be detachable from the main body 2.

Figure 6A:
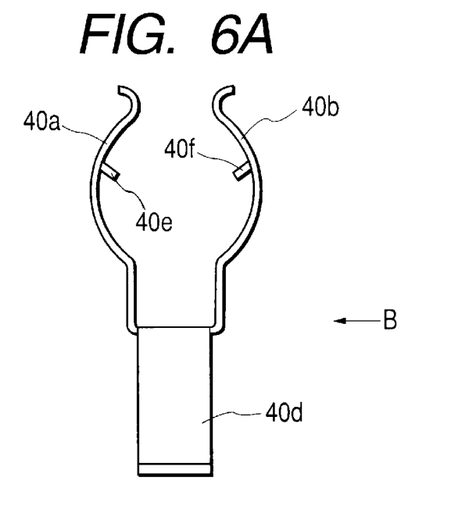
FIG. 6A is a plan view illustrating a holder used in the fluid flow regulator shown in 1.
Figure 6B:
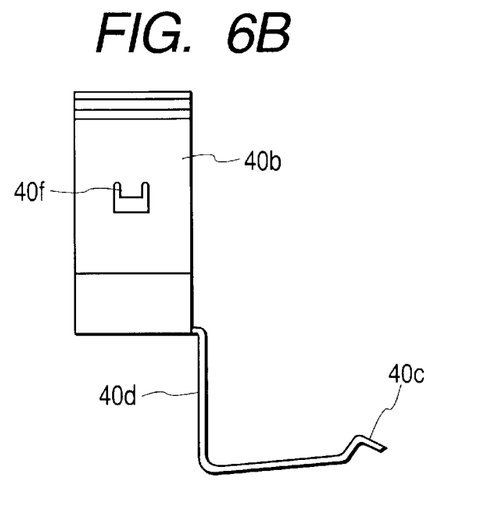
FIG. 6B is a side elevational view taken in the direction of the arrow B shown in FIG. 6A.

As shown in FIGS. 6A and 6B, the holder 40 includes a pair of curved resilient pieces 40a and 40b which are curved and are adapted to hold the main body 2 by their resiliency, as well as a resilient piece 40d for holding the stator casing 38 extending orthogonally from a bifurcating portion of the curved resilient pieces 40a and 40b and having a retaining pawl 40c at its distal end. A pair of projections 40e and 40f are respectively formed on the curved resilient pieces 40a and 40b by cutting out portions of the curved resilient pieces 40a and 40b in the U-shape and by bending the cutout portions inwardly. Meanwhile, as shown in FIG. 1, a step portion 2a for accommodating the curved resilient pieces 40a and 40b is formed in the main body 2 so that the curved resilient pieces 40a and 40b, when fitted on the outer periphery of the main body 2, do not slide in the axial direction along the outer periphery of the main body 2.

Further, a step portion 38a to be engaged with the retaining pawl 40c provided at a distal end of the holding piece 40d is formed on the stator casing 38.

The above-described holder 40 is held on the main body 2 in such a manner as to clamp the outer periphery of the main body 2 by the resiliency of the curved resilient pieces 40a and 40b. At this time, since the projections 40e and 40f provided on the curved resilient pieces 40a and 40b assume a state of apparently biting into the main body 2, the holder 40 is prevented from moving in the circumferential direction. In addition, since the movement of the holder 40 in the axial direction of the main body 2, i.e., in directions toward the front end and the rear end of the main body 2, is restricted by the step portion 2a provided in the main body 2, a reliably held state is obtained.

In the state in which the holder 40 is thus fitted on the main body 2, the stator casing 38 with the stator 32 accommodated therein is attached to the main body 2. At this time, the stator casing 38 is slid toward the main body 2 in such a manner that the rotor casing 23 already joined to the main body 2 is inserted into the central space of the stator casing 38.

As a result, the retaining pawl 40c of the holding piece 40d snaps onto the step portion 38a provided on the stator casing 38 due to its resiliency. The stator casing 38 is held on the main body 2 by the resiliency of the holding piece 40d. Incidentally, when the stator casing 38 is removed from the main body 2, the stator casing 38 can be removed if it is strongly pulled in the direction in which it is detached from the main body 2.

Since the stator casing 38 can be attached to or detached from the main body 2 with one-touch operation in the above-described manner, the maintenance of the stator 32, the coil 31 portion, the power supply unit 36 portion connected to them, or the like can be facilitated.

Next, a description will be given of the on-off control of the flow of the refrigerant in the fluid flow regulator constructed as described above.

First, in a state in which the sphere 25 in the carriage 24 does not abut against the fluid outlet port 28 of the main body 2, the refrigerant flowing through the inlet pipe 4, after entering the main body 2, passes through the fluid outlet port 28, and flows out to the outlet pipe 5. To effect an off-operation with respect to the flow of the refrigerant in this state, the coil 31 is set in an energized state to forwardly rotate the rotor 33 of the stepping motor 3. As a result, the rotor 33 forwardly rotates, and the rotating force of the rotor 33 is transmitted to the rotary shaft 34, so that the rotary shaft also rotates forwardly.

In addition, since the external threads formed on the rotary shaft 34 and the internal threads formed in the bearing 21 are in mesh with each other, as the rotor 33 rotates (rotates forwardly in this case), both the rotor 33 and the rotary shaft 34 move linearly inside the main body 2 toward its front end. Then, the sphere 25 inside the carriage 24 attached to the front end of the rotary shaft 34 is brought into contact with the fluid outlet port 28 provided in the front end portion of the main body 2.

When the sphere 25 is thus brought into contact with the fluid outlet port 28 of the main body 2, the spherical face of the sphere 25 is brought into face-contact with the curved face formed at the fluid outlet port 28, thereby making it possible to reliably stop the flow of the refrigerant. It should be noted that although the driving of the stepping motor 3 may be stopped in this state, the driving is normally continued further to absorb the assembly error or the like.

In the case of the related flow regulator using a needle valve, it is the general practice to provide a friction mechanism whereby, when the rotary shaft 34 or the like are rotating in the direction of closing the valve and in the event that a further undue load is applied although the valve has been closed, that force is absorbed. Namely, in the case of the apparatus which provides control such that, irrespective of whether the needle valve or other valve is used, the rotating force of the motor is converted to a force for moving the valve, and a portion of the valve is inserted into the channel so as to close the channel, there are cases where even if the valve has set the channel in a sealed state, if a force is applied in the direction of further pressing the valve, the valve is set in a locked state, making it impossible to move and return the valve to its original state at the time of effecting the operation of opening the valve.

To prevent the occurrence of such trouble, a member is generally provided such as by providing a stopper or the like to prevent a force for further moving the valve from being applied at the same time as the valve has reached the closing position, or by providing the motor with a friction mechanism whereby in the event that a further undue force is applied although the valve has been set in the closed state, the rotor is made to idle to prevent the valve from being driven further.

However, with the system for restricting the movement of the valve by means of the stopper or the like, the noise due to the impact sound when the valve is brought into contact with the stopper presents a problem. Meanwhile, the friction mechanism has problems in that the number of its components parts is large, and that its structure is complicated and its operational efficiency in assembly is poor. In particular, with the apparatus of this type for which a compact size is much required, it is necessary to provide the friction mechanism in a limited small space, so that a friction mechanism is required which has a simple structure, has excellent operational efficiency in assembly, and achieves a reliable frictional function.

In the case of the invention, the arrangement provided is such that the force for pressing the sphere 25 is absorbed by the coil spring 26, and it is therefore possible to prevent the carriage from becoming locked.

Further, a force for pressing the fluid outlet port 28 with a fixed force or more is applied to the sphere 25 by the expansion force of the coil spring 26, and a force for pressing the sphere 25 against the front end portion of the carriage 24 is constantly applied to the sphere 25 to allow a reliable state of contact to be obtained. Therefore, the back-lash of the sphere 25 inside the carriage is prevented. Consequently, it is possible to prevent the sphere 25 from vibrating due to the pressure of the refrigerant, thereby making it possible to prevent the occurrence of noise due to the vibration of the sphere 25.

In this off state in which the flow of the refrigerant is stopped, if the coil 31 is energized to reverse the rotation of the rotor 33 so as to set the flow of the refrigerant in the on state, the rotor 33 starts to rotate reversely.

As a result, the rotating force of the rotor 33 is transmitted to the rotary shaft 34, which undergoes the reversely rotating, operation together with the rotor 33, and moves in the direction of coming off the main body 2. Then, when the stepping motor 3 operates a predetermined number of steps, the sphere 25 engages the front end portion of the carriage 24. Subsequently, when the rotor 33 further rotates reversely, the sphere 25 starts to move together with the carriage 24, and is disengaged from the fluid outlet port 28, thereby assuming the state in which the refrigerant is allowed to flow (on state).

Namely, even if the carriage 24 moves to some degree (in this case, the carriage moves away from the fluid outlet port 28) due to the rotation of the stepping motor 3, the off state is maintained since the sphere 25 is held in contact with the fluid outlet port 28 by the urging force of the coil spring 26. Then, when the sphere 25 engages the carriage 24 and moves even slightly from the fluid outlet port 28, the valve is set in a fully open state by the sphere 25, and the refrigerant quickly starts to flow. In other words, it is possible to change over the refrigerant flow digitally from the off state to the on state. When this fully open state is assumed, the high-pressure refrigerant on the inlet pipe 4 side abruptly flows into the outlet pipe 5 which is under negative pressure, so that sphere 25 undergoes a rolling motion. The influx of the refrigerant takes place even more smoothly due to this rolling.

As described above, in this embodiment, as the carriage 24 is moved toward the fluid outlet port 28 of the main body 2 by the stepping motor 3, the spherical face of the sphere 25 held in the carriage 24 is brought into contact with the fluid outlet port 28 provided in the main body 2 so as to set the fluid outlet port 28 in the closed state. Meanwhile, as the carriage 24 is moved away from the front end of the main body 2, the spherical face of the sphere 25 assumes a state of non-contact with respect to the fluid outlet port 28, thereby effecting the operation of setting the fluid outlet port 28 in the open state. Thus, it is possible to control the flow of the fluid reliably with a simple structure.

It should be noted that the front end of the rotary shaft 34 on the sphere 25 side projects through a small hole portion 24a of the carriage 24, in which the coil spring 26 is inserted, and reaches a large hole portion 24b. In addition, an inclined face is provided between the small hole portion 24a and the large hole portion 24b. For this reason, when the sphere 25 has sunken into the interior of the carriage 24, the plate 27 is brought into contact with the front end of the rotary shaft 34. Hence, it is possible to avoid a failure at the time when the coil spring 26 is compressed, e.g., the failure that the coil spring 26 enters the interior of the small-diameter hole portion 24a and fails to return, or the failure that the plate 27 is fixed at an inclined position inside the large hole portion 24b. It should be noted that, in this embodiment, the distance between the plate 27 and the front end of the rotary shaft 34 when the sphere 25 has come into contact with the front end portion of the carriage 24 is set to about 0.84 mm.

It should be noted that although the above-described embodiment is an example of the preferred embodiment of the invention, the invention is not limited to the same, and various modifications are possible without departing from the gist of the invention. For example, although in the above-described embodiment a description has been given of the example in which the stepping motor 3 is used as the motor for driving the sphere 25 which functions as the valve, a motor other than the stepping motor may be adopted, or a mechanism other than the motor, such as a solenoid, may be adopted as the driving source.

In addition, although in the above-described embodiment the coil spring 26 is used as the spring for imparting a force for pressing the sphere 25 against the front end portion of the carriage 24, this pressurizing spring may not be the coil spring. For example, it is possible to use a plate spring, and the sphere 25 may be pressed against the front end portion of the carriage 24 by the resiliency of this plate spring.

Figure 7A:
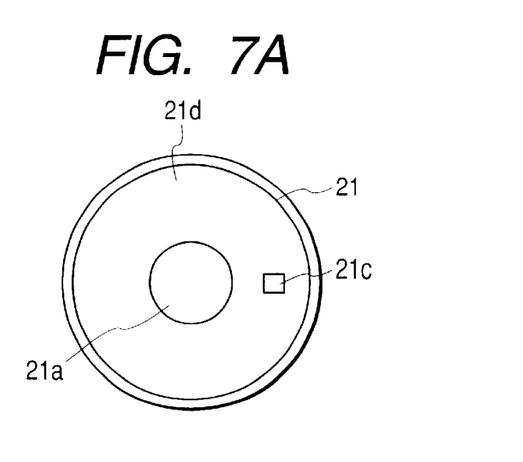
FIGS. 7A and 7B are front view showing modifications of a communication passage in the bearing used in the fluid flow regulator shown in FIG. 1.
Figure 7B:
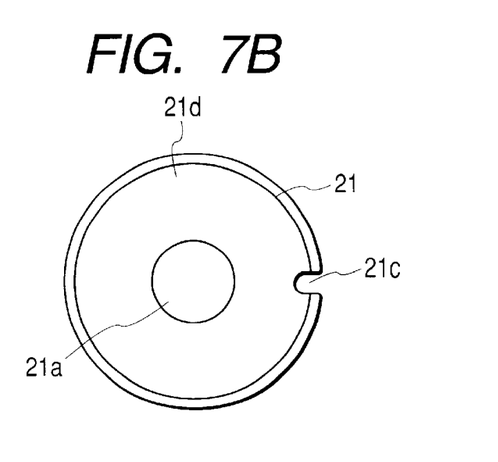

In addition, the communication passage 21c provided in the bearing 21 may be not a hole with a circular cross section. For instance, the communication passage 21c may have a rectangular cross section, as shown in FIG. 7A. Further, as shown in FIG. 7B, this communication passage 21c may be a groove formed in a side face of the bearing 21 in such a manner as to extend from one end face 21d to the other end face 21e.

Further, the holder 40 for holding the stator casing 38 onto the main body 2 is not limited to the structure of the above-described embodiment, and another structure may be adopted insofar as an engaging relationship can be obtained which allows the holding piece 40d and the stator casing 38 to be reliably held with a single motion. Further, the projections 40e and 40f of the holder 40 may not be formed in the shape of pawls, and may be formed in a projecting shape, or the retaining pawl 40c of the holder 40 may be changed to another shape such as an acute-angled shape.

What is claimed is:

1. A flow regulator comprising:
 a cylindrical main body provided with an inlet port and an outlet port, the outlet port formed on a front end portion of the main body;

a carriage accommodated inside the cylindrical main body slidably in an axial direction of the main body;

a sphere held in the carriage such that a part thereof is exposed on a front end portion of the carriage; and a carriage driver for reciprocally moving the carriage inside the main body, wherein a fluid flew into the main body from the inlet port stops flowing out from the outlet port when the sphere is abutted against the outlet port while the carriage is moved by the carriage driver toward the outlet port, wherein the fluid starts flowing out from the outlet port when the sphere is separated from the outlet port while the carriage is moved away from the outlet port by the carriage driver, wherein the carriage includes therein a resilient member for urging the sphere toward the front end portion of the carriage, wherein the carriage driver includes a motor having a rotary shaft around which a thread is formed;

wherein the main body includes a cylindrical bearing for supporting the rotary shaft therein, attached to a rear end portion of the main body;

wherein a thread is formed on an inner peripheral wall of the cylindrical bearing so as to mesh with the thread on the rotary shaft such that the rotary shaft reciprocally moves inside the bearing while rotating; and wherein the rotary shaft is connected to the carriage such that a rotary motion thereof is converted into the reciprocate motion of the carriage.

2. The flow regulator as set forth in claim 1, wherein the motor includes a rotor and a stator;

wherein the rotor is accommodated in a rotor casing attached to the rear end portion of the main body such that the rotor is isolated from an external environment; and wherein the stator is accommodated in a stator casing detachably attached to the main body such that the stator is placed so as to face the rotor through the rotor casing in between.

3. The flow regulator as set forth in claim 2, wherein the stator casing includes an engaging member; and wherein the main body includes a holder having an engaging member with which the engaging member of the stator casing is detachably engaged.

4. The flow regulator as set forth in claim 2, wherein the bearing includes a passage for communicating a space for accommodating the carriage in the main body and a space for accommodating the rotor in the rotor casing.

* * * * *